United States Patent [19]
Kunin et al.

[11] 3,791,866
[45] Feb. 12, 1974

[54] RECOVERY OF WASTE BRINE REGENERANT

[75] Inventors: Robert Kunin, Yardley; William Fries, Southampton, both of Pa.

[73] Assignee: Rohm and Haas Company, Philadelphia, Pa.

[22] Filed: Aug. 7, 1972

[21] Appl. No.: 276,018

[52] U.S. Cl................... 127/46 A, 210/30, 210/63, 260/2.1 R
[51] Int. Cl................................................ C13d 3/14
[58] Field of Search .... 127/46 R, 46 A; 210/30, 59, 210/62, 63

[56] References Cited
UNITED STATES PATENTS

| | | | |
|---|---|---|---|
| 2,381,090 | 8/1945 | Vincent | 127/46 R |
| 2,495,334 | 1/1950 | La Lande | 127/46 R X |
| 2,702,795 | 2/1955 | Gilwood | 210/30 X |
| 2,988,463 | 6/1961 | Vajna | 210/30 X |
| 3,078,224 | 2/1963 | Schulze | 210/30 |
| 3,252,920 | 5/1966 | Goren | 210/30 X |
| 3,302,791 | 2/1967 | Assalini | 127/46 R |
| 3,313,655 | 4/1967 | Miyahara | 210/30 X |
| 3,494,881 | 2/1970 | Ryan | 210/30 X |
| 3,498,911 | 3/1970 | Matsudo-shi | 210/30 |
| 3,591,415 | 7/1971 | Zievers | 127/46 A |
| 3,530,067 | 9/1970 | Friedman | 210/59 X |

OTHER PUBLICATIONS

Chemical Abstracts, Vol. 52:14280h(1958).
Chemical Abstracts, Vol. 60:10377b(1964).
Chemical Abstracts, Vol. 72:135850j(1970).
Chemical Abstracts, Vol. 75:7714t(1971).

*Primary Examiner*—Morris O. Wolk
*Assistant Examiner*—Sidney Marantz
*Attorney, Agent, or Firm*—George W. F. Immons

[57] ABSTRACT

Saline solutions, used to regenerate exhausted porous anion exchange resins loaded with organic color bodies resulting from sugar syrup purification, may be re-used after treatment with an oxidizing reagent such as hydrogen peroxide, sodium hypochlorite or calcium hypochlorite.

7 Claims, No Drawings

RECOVERY OF WASTE BRINE REGENERANT

This invention relates to the decolorization of cane sugar syrups by the use of anion exchange resins. More particularly, it relates to the restoration of usefulness of the saline solution traditionally used to regenerate the color-body loaded decolorization resins.

The economic decolorization of cane sugar syrups employing selected ion exchange resins has now become an established practice in the sugar refining industry. Among the resins which have been successfully employed in this application are Amberlite IRA-93, Amberlite 900, Amberlite IRA-401S, and Amberlite XE-279, all supplied by the Rohm and Haas Company, Philadelphia. In order to operate economically as a decolorizing agent in cane sugar refining, the resin must be capable of operating at elevated temperatures (176°–180°F.) at sugar concentrations of 60° Brix (60 per cent) for many cycles.

Certain of the porous quaternary ammonium resins possess properties that are quite suitable for this application. Although some weakly basic resins can decolorize cane sugar syrups, their use is limited. Fortunately, the porous quaternary ammounium resins can decolorize these syrups, and can be regenerated with a brine solution. The chloride salt of the resin is preferred for two reasons. First, brine is a very cheap and efficient regenerant. Second, the chloride form of the resin removes sulfates, and thereby permits the sugar syrup to be evaporated to a high concentration without the formation of hazes upon standing, which normally happens where $CaSO_4$ is precipitated.

Experience at several plants has shown that several thousand pounds of sugar may be treated per cubic foot of resin per cycle when operated in this manner. Each load-regeneration cycle requires a regenerant dosage of up to 10 pounds of salt per cubic foot. Depending on the source of raw cane, the resin must be revivified every 25 cycles or so with a dilute hypochlorite rinse. The revivification must be applied since some of the colored bodies are apparently irreversibly bound by the resin and resist regeneration with brine. The hypochlorite oxidizes these bodies to a state in which they can be more readily regenerated with brine.

Although many factors affect resin life in applications of this type, experience on a plant-scale operation has indicated that a resin life of 300 cycles, including a hypochlorite rejuvenation every 25 cycles, may be achieved.

Thus, anion exchange resins of quaternary chloride functionality have been used for years in the removal of color from sugar solutions in the sugar refining process. Regeneration of the resins is being effectively accomplished with the use of aqueous salt (NaCl) at approximately the 10% concentration. (See Ion Exchange Resins, 2nd Ed. 1958, J. Wiley & Sons, Inc.) This salt after its use in regeneration is highly colored, containing up to 10% carbon as well as the original 10% NaCl.

The disposal of this waste brine regenerant by normal sewering has become a severe pollution problem. Moreover, there is a significant difference in the character of material being treated with an oxidant, in the present art of sugar decolorization with resins, as compared to the presently taught application. Implicitly, the type of fouling materials which remain irreversibly bound to the resin and resist regeneration with brine, are of a dissimilar chemical nature than those which are readily freed from the resin by the brine regeneration step. The color body loaded regenerant has heretofore been discarded as not amenable to economic purification for reuse in resin regeneration.

Thus, while oxidation of spent decolorizing resins is known in the art, it has never been suggested that one might economically decolorize spent brines in an economic manner as is first disclosed in the present specification. This advantage has now been demonstrated, and on an economic basis. The new gain in reusability of revivified brines by the employment of inexpensive oxidants, such as hydrogen peroxide, calcium hypochlorite and sodium hypochlorite, is meaningful step forward in the art of economic sugar decolorization.

According to the present invention, it is now practical to close the loop in sugar decolorization with ion exchange resins, by reclaiming the waste 10% NaCl regenerant and reusing it. This waste regenerant can be treated with an oxidizing agent such as CaOCl and NaOCl, which under proper conditions will convert essentially all the carbon present as coloring matter to carbon dioxide.

This latter compound can be eliminated from the 10% NaCl solution by purging with air after adjusting the pH slightly to the acid side. The reactions are

In essence the coloring matter in sugar solutions will ultimately be selectively converted to $CO_2$ which may depart the refining process by venting into the air. The restored regenerant liquid containing 10% NaCl, but little or no coloring matter, may be reused for subsequent regeneration of the ion exchange resins. From preliminary cost calculations, it is also reasonable to expect a chemical cost saving in this salt recovery process compared to using new salt.

EXAMPLE I

Synthesis of Resin A

Into a three-liter round bottom flask are placed 980 grams of aqueous liquid and 1.1 grams of immiscible organic liquid. The composition of the aqueous phase is 1080 grams of water, 32.4 grams of salt, 0.216 grams of sodium nitrile, 0.162 grams of gelatin and 16.2 grams of hydrolyzed styrene-maleic anhydride copolymer (dissolved in water).

The composition of the organic layer is 615.0 grams of methyl acrylate, 99.0 grams of commercial divinyl benzene (57.1% DVB) 14.4 grams of diethylene glycol divinyl ether, 243.0 grams of di-isobutyl ketone (DIBK) and 7.16 grams of lauroyl peroxide.

After flushing the systems with nitrogen, the immiscible mixture is stirred at room temperature (about 25°C.) at 145 rpm, with as many on-off stirring cycles as are necessary to disperse completely all the organic liquid into fine droplets (0.2–0.5 mm diameters) in the aqueous layer. After a stable dispersion has formed, heat is applied until the temperature reaches 65°C. The reaction mixture is maintained at 65°C. with the same stirring for 20 hours.

After the polymerization is complete, the flask is arranged so that the DIBK can be azeotropically distilled from the flask. After removal, the beads are washed and then filtered to remove excess water. The resulting copolymer is dried in a stream oven at a maximum temperature of 80°C.

The dried copolymer (500 grams) along with 1483 grams of dimethylaminopropylamine are charged to a stirred pressure reactor. The reactor is sealed, stirring is started and heat is applied. The temperature of the reactor is maintained at 175°C. for 18 hours, and then the reactor is allowed to cool to room temperature. The beads are drained, washed first with methanol and then with water until the wash water is neutral to pH paper. The final product is in the form of opaque white beads of 41% solids, and with an anion exchange capacity of 5.3 milliequivalents per gram.

To a stirred, pressure reactor are charged 1043 grams of the aforeprepared wet resin, 780 grams of water and 26 grams of sodium carbonate. The pressure reactor is evacuated using a water aspirator and sealed with partial vacuum. A methyl chloride source is attached to the reactor and methyl chloride gas is slowly added, until a maximum pressure of 45 psig is registered. The methyl chloride is fed continuously at this pressure for 18 hours or until 101 grams have been added.

Following this reaction, the cylinder is disconnected and the pressure reactor is slowly vented to a hood. The reactor is allowed to be stirred for an additional 30 minutes to remove the bulk of the unreacted dissolved methyl chloride. A nitrogen sparge is then used for one hour to remove the remaining methyl chloride from the bead slurry. The resin is drained and washed with water to remove the residual sodium carbonate. The wash water is drained and the resin is packed out wet. The properties of the final product are:

Appearance: — Opaque white beads
Solids: — 31.3%
Weak base anion exchange capacity: — 0.23 mg./gram
Strong base anion exchange capacity: — 3.90 mg./gram
Total capacity: — 4.13 mg./gram
Percent quaternized: — 94.4%

EXAMPLE II

Twenty liters of waste brine from the regeneration of a quaternary amine ion exchange resin (Resin A), which had just finished decolorizing a very dark mill liquor at 60 Brix, are treated as follows:

a. 0.20 lb. NaOCl (as a 5% solution) is added to the waste brine (50°C.) and stirred fo just 1 minute. b. The solution is allowed to stand one-half hour at 50°C. c. More NaOCl (0.1 lb.) is added with slight stirring and allowed to stand at 50°C. for one-fourth hour. d. Step (c) is repeated again, which gives enough bleach to leave a slight residual color, thus guaranteeing no excess bleach remains. e. Then 0.18 lb. HCl (as 37% solution) is added to obtain a pH of 4.8, and the system purged of dissolved $CO_2$ with nitrogen. f. Finally, the brine was adjusted to pH 7 with 0.077 lb. NaOH.

The resulting solution was found to contain 9.7% NaCl and 0.08% carbon, whereas the original solution before reclamation, contained 10.0% NaCl and 10.0% carbon.

This reclamation system procedure can be followed repeatedly upon the same 10% NaCl solution, which is used to successfully regenerate the same reloaded ion exchange resin through repeated cycles. The data of Table I shows this:

TABLE I

Measured Effluent Color from Using Ion Exchange Resins

| Decolorization Cycle No. | Units of Color(SCV) | | Number of Times Brine Regenerant Reclaimed |
|---|---|---|---|
| | Influent | Effluent | |
| 3 | 58 | 24 | 0 (fresh brine used) |
| 30 | 58 | 24 | 0 (fresh brine used) |
| 32 | 58 | 25 | 1 |
| 42 | 42 | 18 | 5 |

EXAMPLE III

Twenty liters of color loaded waste brine from the regeneration of a quarternary amine ion exchange resin, which have just decolorized a medium color sugar solution, were treated by the procedure described in Example II. Less total reagent was required because the treated regenerant was not so highly colored initially as was the regenerant of the preceding example.

The reagents were employed as follows:
Total NaOCl = 0.10 lb.
Total HCl = 0.044 lb.
Total NaOh = 0.049 lb.

Similarly, the same brine regenerant is reusable many times, after reclamation, regenerating the same resin bed.

Table II presents the results of this Decolorization Run:

TABLE II

Measured Effluent Color from Ion Exchange Resins

| Decolorization Cycle No. | Units of Color(SCV) Effluent from Resin | Number of Times Brine Reclaimed |
|---|---|---|
| 2 | 9 | 0 |
| 3 | 12 | 0 |
| 24 | 12 | 0 |
| 30 | 15 | 0 |
| 32 | 15 | 1 |
| 33 | 10 | 2 |
| 37 | 12 | 0 |
| 41 | 9 | 4 |
| 42 | 13 | 5 |

EXAMPLE IV

Example III was repeated using amounts of calcium hypochlorite equivalent to the sodium hypochlorite employed in Example III. Results obtained were essentially equivalent to those obtained in Example III. However, the rejuvenated brine needs to be filtered to remove excess sulfates and phosphate that accumulated.

EXAMPLE V

Example IV was repeated using amounts of CaO and $Cl_2$ equivalent to the amount of hypochlorite used in same example. Results obtained were essentially equivalent to that obtained in previous Example III.

EXAMPLE VI

Example III was repeated using a weak base anion exchange resin, Amberlite IRA-93*, partially (50%) converted to the hydrochloride salt, in place of the strong base anion exchange resin. Results were practically identical to those obtained previously.

EXAMPLE VIII

SYNTHESIS OF RESIN B

A. Into a one-liter, three-necked, balloon flask equipped with thermometer, mechanical stirrer, and reflux condenser are poured 400 ml. of water and 34 ml. of a 1.5% aqueous solution of magnesium silicate. Agitation is begun, and a solution containing 97.5 g. of styrene, 1 g. of divinyl benzene, and 1.5 g. of ethyl styrene, with 1 g. of benzoyl peroxide dissolved therein, is added to the contents of the flask. The stirred mixture is then heated to 90°C. and held there for 1½ hours, after which the mixture is heated at refluxing temperature for an additional 1½ hours. The reaction mixture is then cooled to room temperature and the solid spheroids of the copolymer were separated from the liquid by decantation and filtration, air-dried, and finally oven-dried for 2 hours at 125°C.

In a similar manner, copolymers containing higher amounts of divinyl benzene may be prepared.

B. Fifty grams of the beads of copolymer prepared in Part A above are placed in a one-liter, three-necked, balloon flask equipped with thermometer, mechanical stirrer, and reflux condenser. This amount corresponds to 0.5 mole of styrene in the form of a cross-linked copolymer. One hundred grams (1.25 moles) of chloromethyl ether, having the formula $CH_3\text{-}O\text{-}CH_2Cl$, are added, and the mixture is allowed to stand at room temperature for 15 minutes during which time the beads of copolymer swelled. The mixture is then diluted with 115 ml. of petroleum ether (B.P. 30° C. – 60° C.) and agitation is begun. The reaction mixture was cooled to 0° C. by means of an ice-salt bath, and at this point 30 grams (0.23 mole) of anhydrous, powdered aluminum chloride are added in small portions over a period of 1 hour, after which the mixture was stirred at 0°C. for 2 hours. Then 500 ml. of ice-water is slowly added in order to decompose the excess of aluminum chloride and chloromethyl ether. The resultant mixture is stirred for 30 minutes and is filtered. The beads are first dried in air, then washed several times with water, and finally dried in an oven at 125° C. for 2 hours. The beads contained 21.97% chlorine by analysis.

C. In a 500 ml., three-necked, balloon flask, equipped with an agitator, reflux condenser, thermometer, and a gas-inlet tube, are placed 115 ml. of benzene and 50 grams of the chloromethylated beads, prepared in Part B above. Agitation is begun and the mixture is heated to refluxing temperature and held there for 30 minutes, during which time the beads swell. The mixture is cooled to 20°C. and then saturated with anhydrous trimethylamine gas. The mixture is then heated to 50°–55°C. and held there for four hours while a steady stream of trimethylamine is passed therethrough. The mixture is then cooled to room temperature and allowed to stand overnight, after which the beads are filtered off, washed twice with benzene, and air-dried. The dried beads, free of benzene, are then mixed with a 10% aqueous solution of sulfuric acid for 2 hours, after which they were washed thoroughly with water, and are finally converted to the form of the quaternary ammonium hydroxide by being stirred with a 15% aqueous solution of sodium hydroxide. The final product is washed with water until the wash-water no longer gives a pink color with phenolphthalein.

The dried beads contained 5.68% nitrogen by analysis, have high capacity for adsorbing anions, and have such physical characteristics suitable for repeated use in adsorbing ions and being regenerated.

EXAMPLE IX

One gallon of waste brine from the regeneration of the quaternary amine ion exchange resin of Ex. VIII, (Resin B) which had just finished decolorizing a very dark mill liquor like that of Example II was treated as follows:

The submitted brine sample was treated with 0.03%, 0.17% and 0.35% of hydrogen peroxide. The treatment was for 4 hours at 170°F.

After the bleaching treatment, Leitz Photometer readings were obtained on the samples as follows:

| No. | Sample | |
|---|---|---|
| 1. | Blank (original sample) | 5 |
| 2. | 0.03% $H_2O_2$ | 7 |
| 3. | 0.17% $H_2O_2$ | 68 |
| 4. | 0.35% $H_2O_2$ | 82 |

It thus appears that about 4 pounds of 35% $H_2O_2$ would be required per 100 gallons of spent brine for an effective degree of decolorization.

It follows that the quantity of oxidant necessary to substantially destroy the organic colorants in the brine is directly related to the color of the waste brine. The International Stammer Color Scale (SCV) was adapted for calculation of this relationship. Generally, it is estimated that from 0.002 to 0.02 lbs. of oxidizing reagent are required to decolorize 20 liters of brine having one SCV unit.

In an experiment carried out with NaOCl, by way of example, it was found that approximately 0.0077 lb. NaOCl was required to decolorize 20 liters of brine one SCV unit. This was found to be true between 13 and 51 SCU. The decolorization of the brine was always taken down to approximately 3 SCU at pH 7.0, leaving enough color to ensure no excess chlorine is present, but not enough color to interfere with the subsequent use of this brine for regenerating decolorization resins. The carbon content was generally reduced from the 1–10% range to less than 0.1% in this operation.

We claim:

1. In the process of decolorizing cane sugar syrups by the use of a porous anion exchange resin, wherein said resins are cyclically loaded with organic color bodies and are regenerated by the flowing therethrough of saline solutions, to release substantially all of the adsorbed organic color bodies, the improvement comprising: contacting the spent saline solution with an oxidizing reagent selected from one or more of hydrogen peroxide, sodium hypochlorite and calcium hypochlorite, whereby the organic colorants are substantially destroyed, and the regenerated brine is thusly made suitable for further use in regenerating resins loaded with color bodies.

2. The process of claim 1 wherein the decolorizing resin is a copolymer of about 90% methyl acrylate, about 8% divinylbenzene, about 2% diethyleneglycol divinylether, which has been aminolyzed with an alkylamine.

3. The process of claim 1 wherein the oxidizing reagent is sodium hypochlorite.

4. The process of claim 1 wherein the oxidizing reagent is hydrogen peroxide.

5. The process of claim 1 wherein said ion exchange resin is tertiary amine anion exchange resin.

6. The process of claim 1 wherein said ion exchange resin is quaternary ammonium anion exchange resin.

7. The process of claim 1 wherein the decolorizing resin is a copolymer of about 99% styrene and about 1% divinyl benzene, which has then been chloromethylated, and then aminated with an alkyl tertiary amine.

* * * * *